United States Patent
Rosenbecker et al.

(10) Patent No.: US 12,148,956 B2
(45) Date of Patent: *Nov. 19, 2024

(54) BATTERY PACK DETECTION AND BATTERY DISCHARGE MODE SELECTION

(71) Applicant: MILWAUKEE ELECTRIC TOOL CORPORATION, Brookfield, WI (US)

(72) Inventors: Jay Rosenbecker, Menomonee Falls, WI (US); Randolph McHugh, Sullivan, WI (US); Fraizier Reiland, Myrtle Beach, SC (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,423

(22) Filed: Apr. 17, 2023

(65) Prior Publication Data

US 2023/0253688 A1 Aug. 10, 2023

Related U.S. Application Data

(63) Continuation of application No. 16/951,516, filed on Nov. 18, 2020, now Pat. No. 11,631,926.
(Continued)

(51) Int. Cl.
*H01M 50/581* (2021.01)
*B25F 5/00* (2006.01)
(Continued)

(52) U.S. Cl.
CPC ............ *H01M 50/581* (2021.01); *B25F 5/00* (2013.01); *H01M 10/4257* (2013.01);
(Continued)

(58) Field of Classification Search
CPC ............ H01M 50/209; H01M 50/244; H01M 50/296; H01M 50/262; H01M 50/213; H01M 50/247; H01R 33/975; B25F 5/02
See application file for complete search history.

(56) References Cited

U.S. PATENT DOCUMENTS

| 5,164,652 | A | 11/1992 | Johnson et al. |
| 5,196,779 | A | 3/1993 | Alexandres et al. |

(Continued)

FOREIGN PATENT DOCUMENTS

| CN | 104578266 A | 4/2015 |
| CN | 105871021 B | 7/2018 |

(Continued)

OTHER PUBLICATIONS

Japanese Patent Office Action for Application No. 2022-530853 dated Jul. 4, 2023 (8 pages including machine English translation).
(Continued)

*Primary Examiner* — Nathaniel C Chukwurah
(74) *Attorney, Agent, or Firm* — Michael Best & Friedrich LLP (57) ABSTRACT

A power tool including a battery pack interface configured to receive a battery pack. The battery pack interface includes one or more power terminals and one or more communication terminals. The power tool further includes a controller having an electronic processor. The controller is configured to receive, via the one or more communication terminals, a plurality of signals indicating a plurality of temperatures of the battery pack. The controller is further configured to determine, based on the signals, a battery pack type. The controller is further configured to control discharge of the battery pack based on the battery pack type.

20 Claims, 8 Drawing Sheets

Related U.S. Application Data (60) Provisional application No. 62/940,583, filed on Nov. 26, 2019.

(51) Int. Cl.
  *H01M 10/42* (2006.01)
  *H01M 10/48* (2006.01)
  *H01M 50/20* (2021.01)
  *H02J 7/00* (2006.01)

(52) U.S. Cl.
  CPC ......... *H01M 10/486* (2013.01); *H01M 50/20* (2021.01); *H02J 7/0025* (2020.01)

(56) References Cited

U.S. PATENT DOCUMENTS

| | | | |
|---|---|---|---|
| 5,237,257 | A | 8/1993 | Johnson et al. |
| 5,489,834 | A | 2/1996 | Pitkanen |
| 5,912,544 | A | 6/1999 | Miyakawa et al. |
| 6,112,105 | A | 8/2000 | Olsson |
| 7,541,775 | B2 | 6/2009 | Lee |
| 7,589,500 | B2 * | 9/2009 | Johnson ............ H02J 7/00 320/132 |
| 7,839,121 | B2 | 11/2010 | Kim |
| 8,847,532 | B2 | 9/2014 | Miyazaki et al. |
| 11,631,926 | B2 * | 4/2023 | Rosenbecker ....... H01M 50/20 173/213 |
| 2005/0073282 | A1 | 4/2005 | Carrier et al. |
| 2005/0221654 | A1 | 10/2005 | Phillips et al. |
| 2006/0087286 | A1 | 4/2006 | Phillips et al. |
| 2011/0197389 | A1 | 8/2011 | Ota et al. |
| 2011/0248653 | A1 | 10/2011 | Brotto et al. |
| 2012/0293096 | A1 | 11/2012 | Mizoguchi et al. |
| 2013/0080094 | A1 | 3/2013 | Teng |
| 2014/0028226 | A1 * | 1/2014 | Mergener .............. B25F 5/00 318/400.09 |
| 2014/0154535 | A1 * | 6/2014 | Olsson ............... H01M 10/613 429/53 |
| 2016/0028130 | A1 | 1/2016 | Dvorkin et al. |
| 2017/0194670 | A1 | 7/2017 | Kawano et al. |
| 2017/0373615 | A1 * | 12/2017 | Lewis ................... H02K 7/145 |
| 2018/0048173 | A1 | 2/2018 | Kawano et al. |
| 2018/0183257 | A1 * | 6/2018 | Minnickel .......... H02J 7/00712 |
| 2019/0145833 | A1 | 5/2019 | Ryu et al. |

FOREIGN PATENT DOCUMENTS

| | | |
|---|---|---|
| EP | 2375542 A2 | 10/2011 |
| JP | H10136574 A | 5/1998 |
| JP | 2004135460 A | 4/2004 |
| JP | 2008517578 A | 5/2008 |
| WO | 2005034604 A2 | 4/2005 |
| WO | 2016098565 A1 | 6/2016 |

OTHER PUBLICATIONS

Extended European Search Report for Application No. 20892704.6 dated Oct. 16, 2023 (9 pages).

International Search Report and Written Opinion for Application No. PCT/US2020/061024 dated Mar. 11, 2021 (11 pages).

* cited by examiner

BATTERY PACK DETECTION AND BATTERY DISCHARGE MODE SELECTION

RELATED APPLICATIONS

This application is a continuation of U.S. patent application Ser. No. 16/951,516, filed Nov. 18, 2020, which claims the benefit of U.S. Provisional Patent Application No. 62/940,583, filed Nov. 26, 2019, the entire content of each of which is hereby incorporated by reference.

FIELD

Embodiments described herein relate to electrical devices powered by one or more batteries and/or battery packs.

SUMMARY

Battery packs may include a temperature sensor, such as a thermistor, for determining the temperature of the device as the device is charged or discharged. These temperature sensors may be used for protection measures, such as stopping charge or discharge when a temperature passes a threshold.

Power tools described herein include a battery pack interface configured to receive a battery pack. The battery pack interface includes one or more power terminals and one or more communication terminals. The power tools further include a controller having an electronic processor. The controller is configured to receive, via the one or more communication terminals, a plurality of signals indicating a plurality of temperatures of the battery pack. The controller is further configured to determine, based on the signals, a battery pack type. The controller is further configured to control discharge of the battery pack based on the battery pack type.

In some embodiments, the discharge of the battery pack includes a constant power. In some embodiments, the discharge of the battery pack includes a step function of decreasing power. In some embodiments, the discharge of the battery pack includes a series of decreasing ramp functions. In some embodiments, the battery pack discharges at a first power for a first period of time, decreases from the first power to a second power over a second period of time, and discharges at a third power over a third period of time. In some embodiments, the plurality of signals indicating a temperature of the battery pack is provided by a thermistor of the battery pack. In some embodiments, the plurality of signals indicating a temperature of the battery pack are equal in value.

In some embodiments, determining the battery pack type further includes receiving a first signal of the plurality of signals indicating a temperature of the battery pack, receiving a second signal of the plurality of signals indicating a temperature of the battery pack, and determining a slope of the plurality of signals by subtracting the second signal from the first signal. In some embodiments, the step of determining, based on the plurality of signals, the battery pack type further includes comparing the slope of the plurality of signals to a predetermined slope.

Battery packs described herein include a housing, at least one battery cell contained within the housing, and a battery pack interface configured to connect to an electronic device. The battery pack interface includes one or more power terminals and one or more communication terminals. The battery packs further include a discharge circuit configured to discharge current from the battery cells to the one or more terminals of the battery interface. The battery packs also include a thermistor configured to provide a plurality of signals indicating a plurality of temperatures of the battery pack to the one or more communication terminals of the battery pack interface. The plurality of signals are provided to the electronic device to determine a type of the battery pack for controlling discharge of the battery pack based on the type of the battery pack.

In some embodiments, the discharge of the battery pack includes a constant power. In some embodiments, the discharge of the battery pack includes a ramp function of decreasing power. In some embodiments, the plurality of signals indicating a temperature of the battery pack is provided by a thermistor of the battery pack. In some embodiments, the plurality of signals indicating a temperature of the battery pack are equal in value. In some embodiments, determining the battery pack type further includes comparing a slope of the plurality of signals to a predetermined slope.

Methods described herein provide for determining a battery pack type. The methods include receiving, by a battery pack interface of a power tool, a battery pack. The methods further include receiving, by one or more communication terminals of the battery pack interface, a plurality of signals indicating a plurality of temperatures of the battery pack. The method further includes determining, based on the plurality of signals, the battery pack type. The methods further include controlling, based on the battery pack type, a discharge cycle of the battery pack.

In some embodiments, the plurality of signals indicating a temperature of the battery pack is provided by a thermistor of the battery pack. In some embodiments, the plurality of signals indicating a temperature of the battery pack are equal in value. In some embodiments, the method further includes comparing a slope of the plurality of signals to a predetermined slope. In some embodiments, the battery pack discharges at a first power for a first period of time, decreases from the first power to a second power over a second period of time, and discharges at a third power over a third period of time.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in a non-transitory, computer-readable medium.

Similarly, embodiments described herein may be implemented as a non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Other aspects of the embodiments will become apparent by consideration of the detailed description and accompanying drawings.

DETAILED DESCRIPTION

Figure 1:
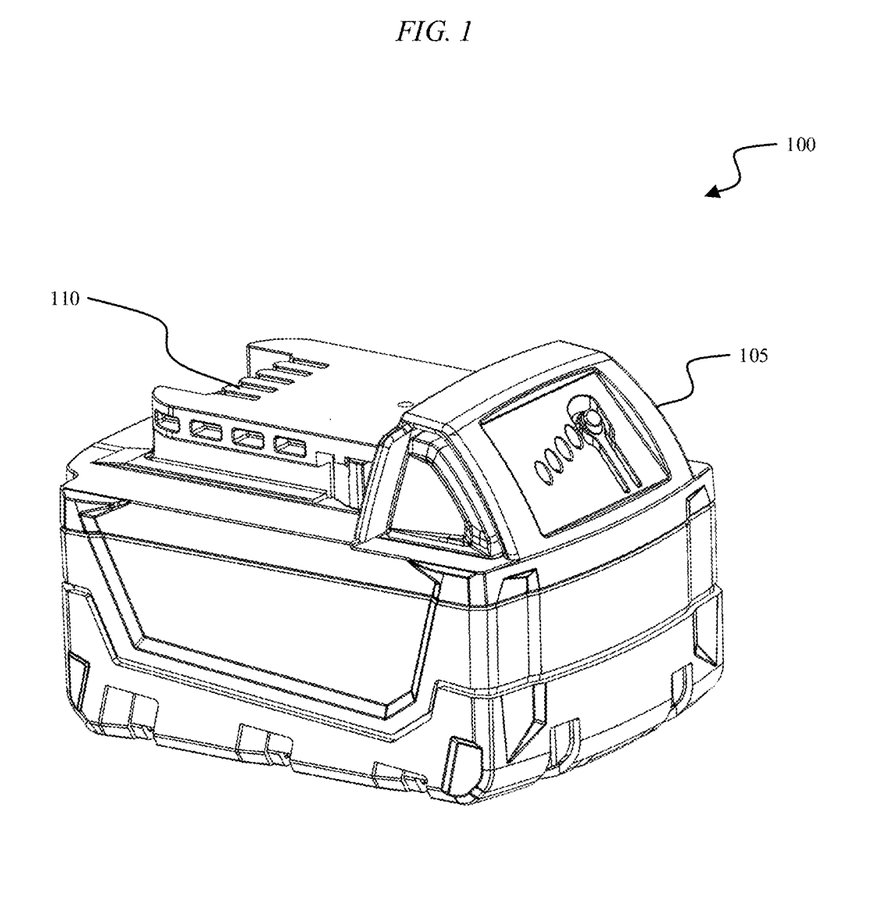
FIG. 1 illustrates a battery pack, according to some embodiments.

FIG. 1 illustrates a battery pack 100 according to some embodiments. The battery pack 100 includes a housing 105 and an interface portion 110 (e.g., a battery interface, a battery pack interface) for connecting the battery pack 100 to a device (e.g., an electrical device such as, but not limited to, a power tool).

Figure 2:
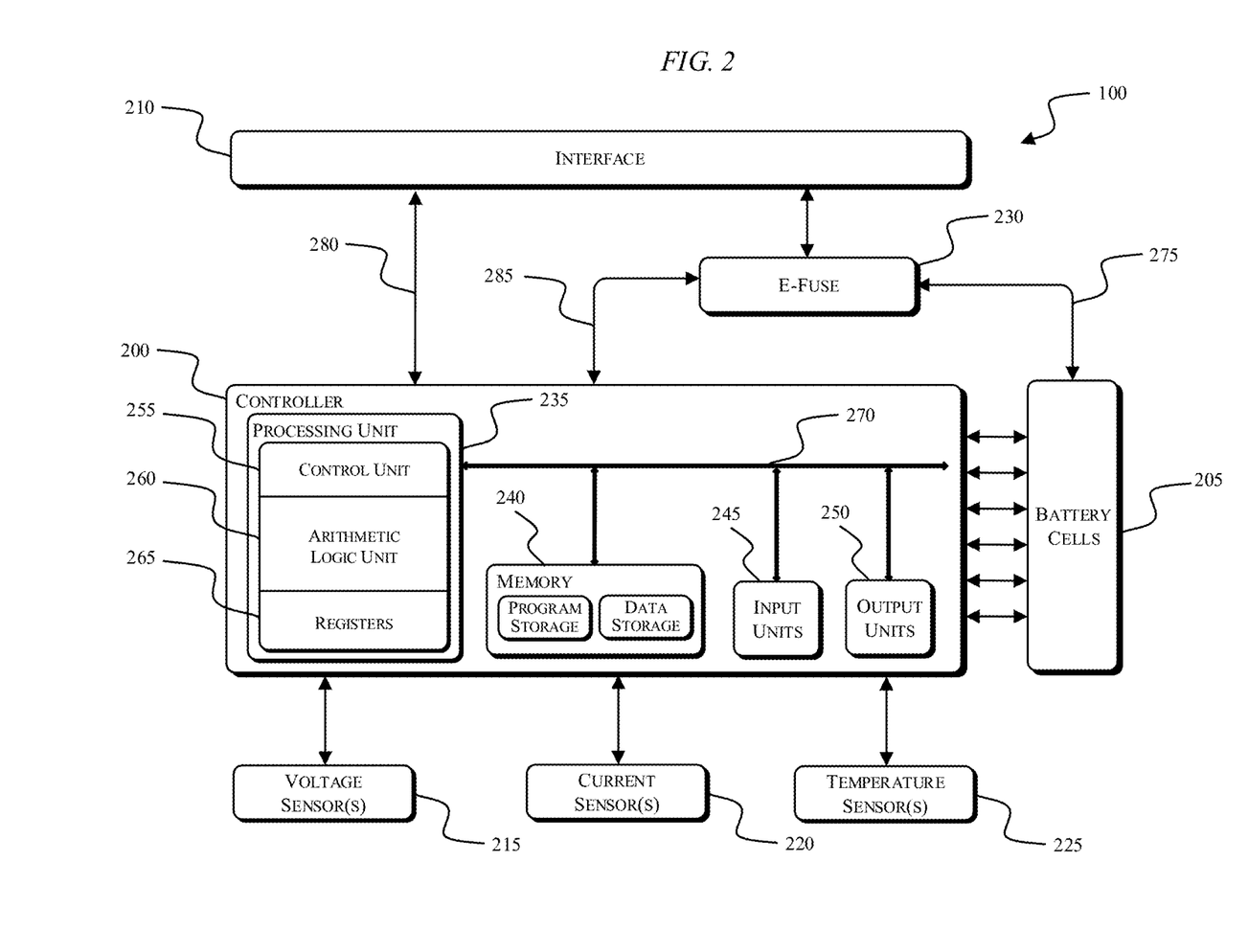
FIG. 2 illustrates a control system for the battery pack of FIG. 1, according to some embodiments.

FIG. 2 illustrates a control system for the battery pack 100 according to some embodiments. The control system includes a controller 200. The controller 200 is electrically and/or communicatively connected to a variety of modules or components of the battery pack 100. For example, the illustrated controller 200 is connected to one or more battery cells 205 and an interface 210 (e.g., the interface portion 110 of the battery pack 100 illustrated in FIG. 1). The controller 200 is also connected to one or more voltage sensors or voltage sensing circuits 215, one or more current sensors or current sensing circuits 220, and one or more temperature sensor(s) or temperature sensing circuit(s) 225. The temperature sensing circuit(s) 225 may include, for example, a thermistor. The temperature sensing circuit(s) 225 sends a signal to the controller 200 indicating a temperature of the battery pack. A resettable electronic fuse 230 is connected between the one or more battery cells 205 and the interface 210. The controller 200 includes combinations of hardware and software that are operable to, among other things, control the operation of the battery pack 100, control the operation of the resettable electronic fuse 230, monitor a condition of the battery pack 100, enable or disable charging of the battery pack 100, enable or disable discharging of the battery pack 100, etc.

The controller 200 includes a plurality of electrical and electronic components that provide power, operational control, and protection to the components and modules within the controller 200 and/or the battery pack 100. For example, the controller 200 includes, among other things, a processing unit 235 (e.g., a microprocessor, a microcontroller, or another suitable programmable device), a memory 240, input units 245, and output units 250. The processing unit 235 includes, among other things, a control unit 255, an arithmetic logic unit ("ALU") 260, and a plurality of registers 265 (shown as a group of registers in FIG. 2), and is implemented using a known computer architecture (e.g., a modified Harvard architecture, a von Neumann architecture, etc.). The processing unit 235, the memory 240, the input units 245, and the output units 250, as well as the various modules or circuits connected to the controller 200 are connected by one or more control and/or data buses (e.g., common bus 270). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 240 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 235 is connected to the memory 240 and executes software instructions that are capable of being stored in a RAM of the memory 240 (e.g., during execution), a ROM of the memory 240 (e.g., on a generally permanent basis), or another non-transitory computer readable medium such as another memory or a disc. Software included in the implementation of the battery pack 100 can be stored in the memory 240 of the controller 200. The software includes, for example, firmware, one or more applications, program data, filters, rules, one or more program modules, and other executable instructions. The controller 200 is configured to retrieve from the memory 240 and execute, among other things, instructions related to the control processes and methods described herein. In other constructions, the controller 200 includes additional, fewer, or different components.

The interface 210 includes a combination of mechanical components (e.g., rails, grooves, latches, etc.) and electrical components (e.g., one or more terminals) configured to and operable for interfacing (e.g., mechanically, electrically, and communicatively connecting) the battery pack 100 with another device (e.g., a power tool, a battery pack charger, etc.). For example, the interface 210 is configured to receive power through the resettable electronic fuse 230 via a power line 275 between the one or more battery cells 205 and the interface 210. The interface 210 is also configured to communicatively connect to the controller 200 via a communications line 280. In some embodiments, the controller 200 is also electrically and/or communicatively connected to the resettable electronic fuse 230 via a signal line 285.

Figure 3:
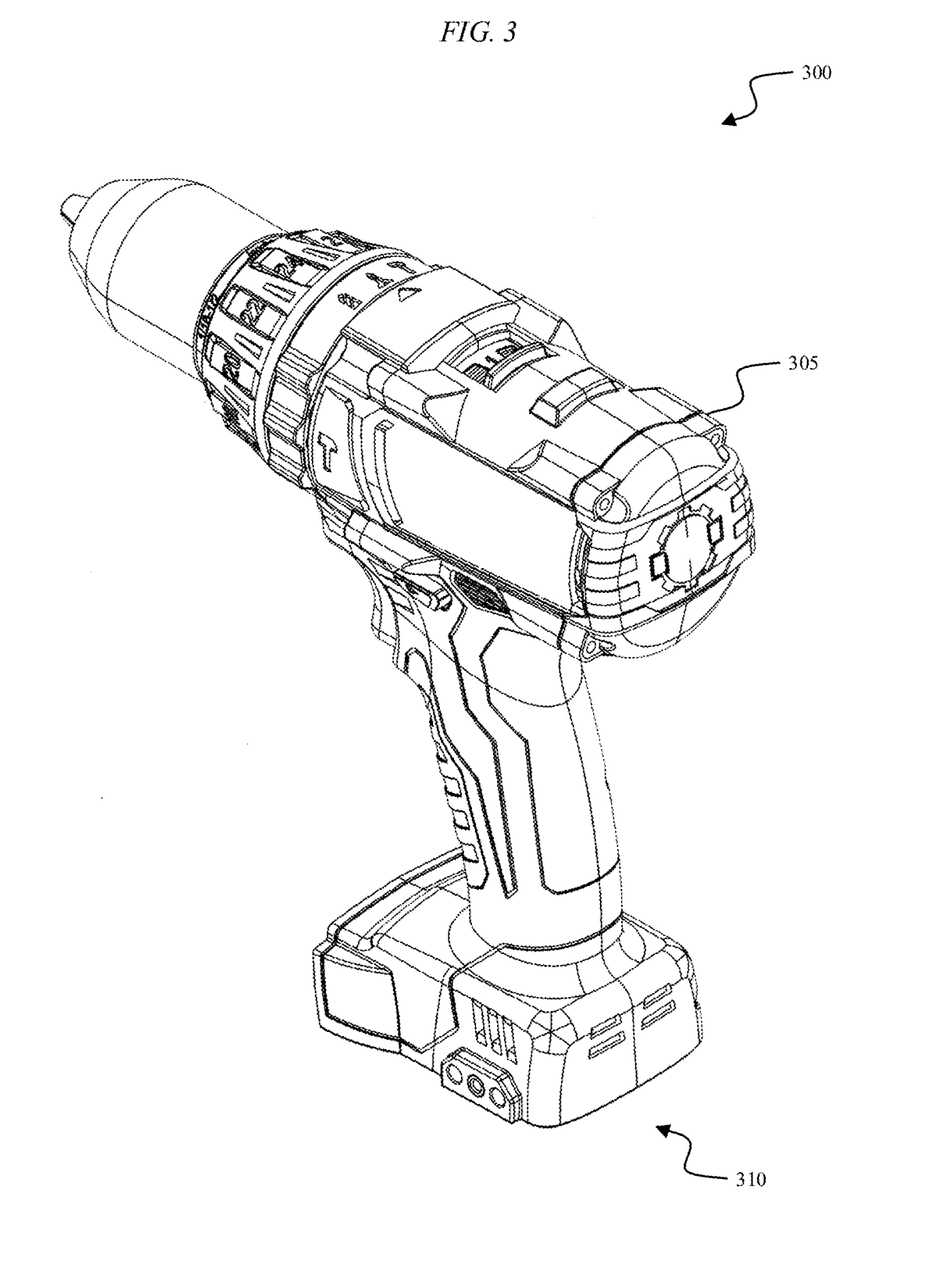
FIG. 3 illustrates a device, according to some embodiments.
Figure 4:
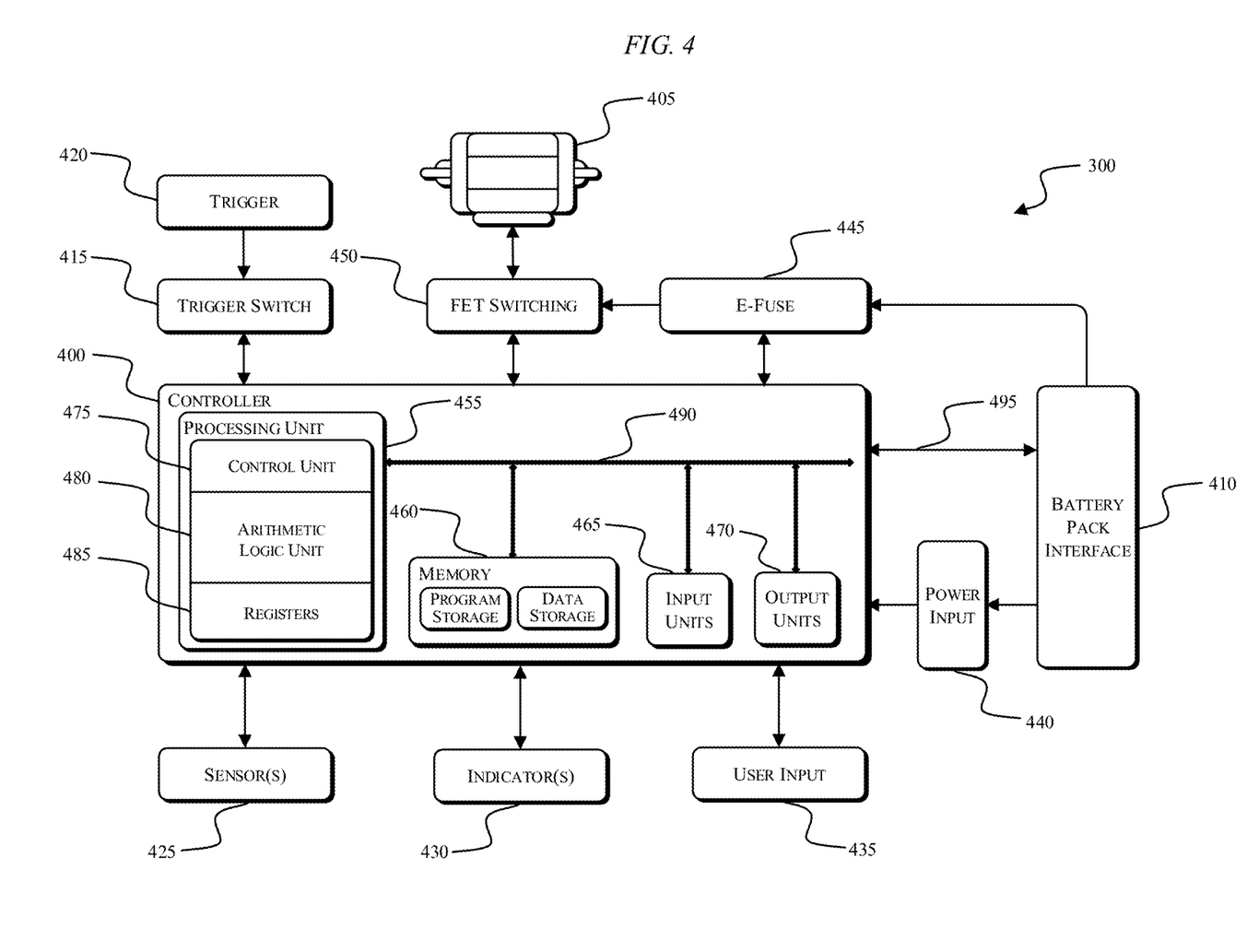
FIG. 4 illustrates a control system for the device of FIG. 3, according to some embodiments.

FIG. 3 illustrates a device 300 according to some embodiments. In the embodiment illustrated in FIG. 3, the device is a power tool (e.g., a drill/driver). In other embodiments, the device 300 is a different type of power tool (e.g., an impact wrench, a ratchet, a saw, a hammer drill, an impact driver, a rotary hammer, a grinder, a blower, a trimmer, etc.) or a different type of device (e.g., a light, a non-motorized sensing tool, etc.). The device 300 includes a housing 305 and an interface portion 310 (e.g., a battery interface, a battery pack interface) for connecting the device 300 to, for example, the battery pack 100 or another device FIG. 4 illustrates a control system for the device 300. The control system includes a controller 400. The controller 400 is electrically and/or communicatively connected to a variety of modules or components of the device 300. For example, the illustrated controller 400 is electrically connected to a motor 405, a battery pack interface 410, a trigger switch 415 (connected to a trigger 420), one or more sensors or sensing circuits 425, one or more indicators 430, a user input module 435, a power input module 440, a resettable electronic fuse 445, and a FET switching module 450 (e.g., including a plurality of switching FETs). The controller 400 includes combinations of hardware and software that are operable to, among other things, control the operation of the device 300, monitor the operation of the device 300, activate the one or more indicators 430 (e.g., an LED), etc. The resettable electronic fuse 445 is connected between the battery pack interface 410 and the FET switching module 450.

The controller 400 includes a plurality of electrical and electronic components that provide power, operational control, and protection to the components and modules within the controller 400 and/or the device 300. For example, the controller 400 includes, among other things, a processing unit 455 (e.g., a microprocessor, a microcontroller, an electronic controller, an electronic processor, or another suitable programmable device), a memory 460, input units 465, and output units 470. The processing unit 455 includes, among other things, a control unit 475, an ALU 480, and a plurality of registers 485 (shown as a group of registers in FIG. 4), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 4 for illustrative purposes. The use of one or more control and/or data buses for the interconnection between and communication among the various modules, circuits, and components would be known to a person skilled in the art in view of the invention described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the device 300 can be stored in the memory 460 of the controller 400. The software includes, for example, firmware, one or more applications, program data, filters, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The battery pack interface 410 includes a combination of mechanical components (e.g., rails, grooves, latches, etc.) and electrical components (e.g., one or more terminals) configured to and operable for interfacing (e.g., mechanically, electrically, and communicatively connecting) the device 300 with a battery pack (e.g., the battery pack 100). For example, power provided by the battery pack 100 to the device 300 is provided through the battery pack interface 410 to the power input module 440. The power input module 440 includes combinations of active and passive components to regulate or control the power received from the battery pack 100 prior to power being provided to the controller 400. The battery pack interface 410 also supplies power to the FET switching module 450 through the resettable electronic fuse 445 to be switched by the switching FETs to selectively provide power to the motor 405. The battery pack interface 410 also includes, for example, a communication line 495 for provided a communication line or link between the controller 400 and the battery pack 100. Information transmitted on the communication line 495 may include, for example, a signal indicating temperature information of the battery pack 100.

The indicators 430 include, for example, one or more light-emitting diodes ("LEDs"). The indicators 430 can be configured to display conditions of, or information associated with, the device 300. For example, the indicators 430 are configured to indicate measured electrical characteristics of the device 300, the status of the device, the status of the resettable electronic fuse 445, etc. The user input module 435 is operably coupled to the controller 400 to, for example, select a forward mode of operation or a reverse mode of operation, a torque and/or speed setting for the device 300 (e.g., using torque and/or speed switches), etc. In some embodiments, the user input module 435 includes a combination of digital and analog input or output devices required to achieve a desired level of operation for the device 300, such as one or more knobs, one or more dials, one or more switches, one or more buttons, etc.

Figure 5:
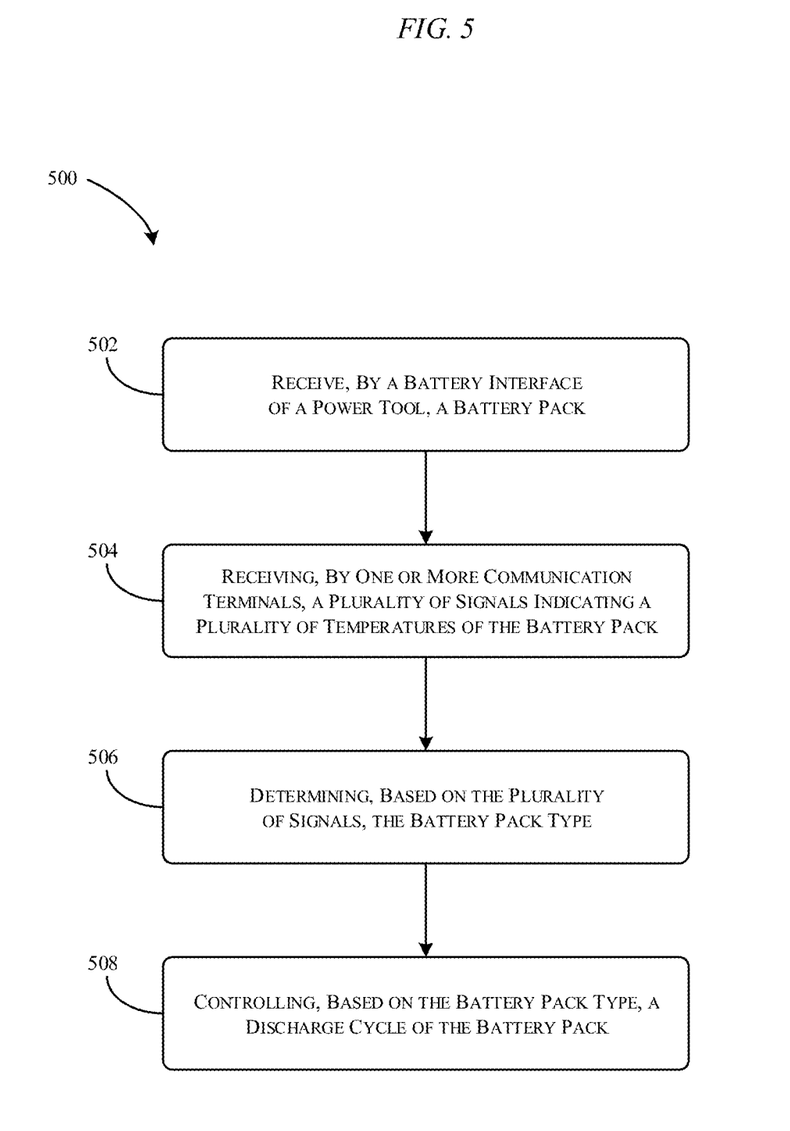
FIG. 5 illustrates a method for determining a battery pack type, according to some embodiments.

FIG. 5 illustrates a method 500 performed by the device 300 for determining a battery pack type of the battery pack 100. The method begins at block 502 with receiving, via the battery pack interface 410 of the device 300, the battery pack 100. For example, interface portion 310 of the device 300 of FIG. 3 connects with interface portion 110 of the battery pack 100.

At block 504, the device 300 receives, by one or more communication terminals, a plurality of signals indicating a plurality of temperatures of the battery pack 100. In one embodiment, the temperature sensing circuit(s) 225 of the battery pack 100 signals to the controller 200 information indicating the temperature of the battery pack 100. The controller 200 transmits this information to the controller 400 of the device 300 via the interface 210. In an alternative embodiment, the temperature sensing circuit(s) 225 is directly connected to the interface 210 and sends the signal directly to the controller 400 of the device 300. The signal indicating the temperature of the battery pack 100 is continuously transmitted to the device 300, providing a plurality of signals indicating a plurality of temperatures of the battery pack 100. In another embodiment, a signal indicating a temperature of the battery pack 100 is transmitted to the device 300 at discrete time values. For example, the discrete time values may be once every 3 seconds.

Figure 6A:
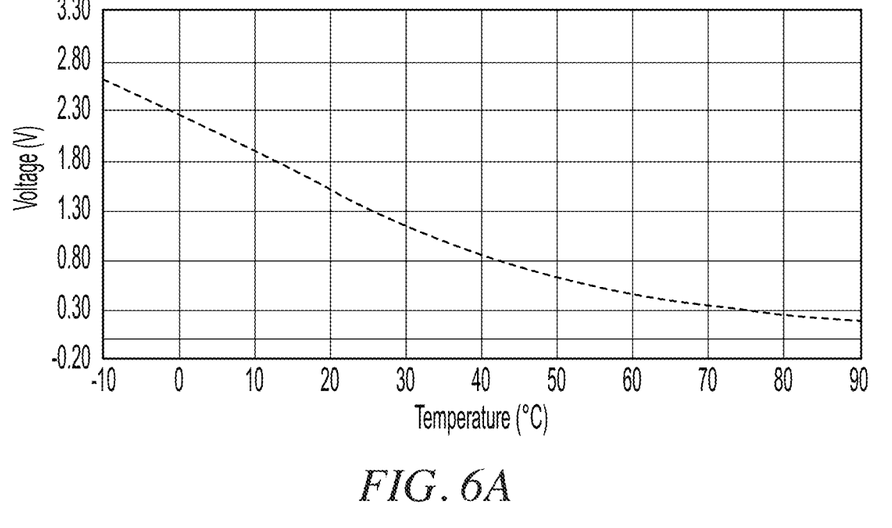
FIGS. 6A and 6B illustrate a plurality of signals indicating the plurality of temperatures of the battery pack of FIG. 1, according to some embodiments.
Figure 6B:
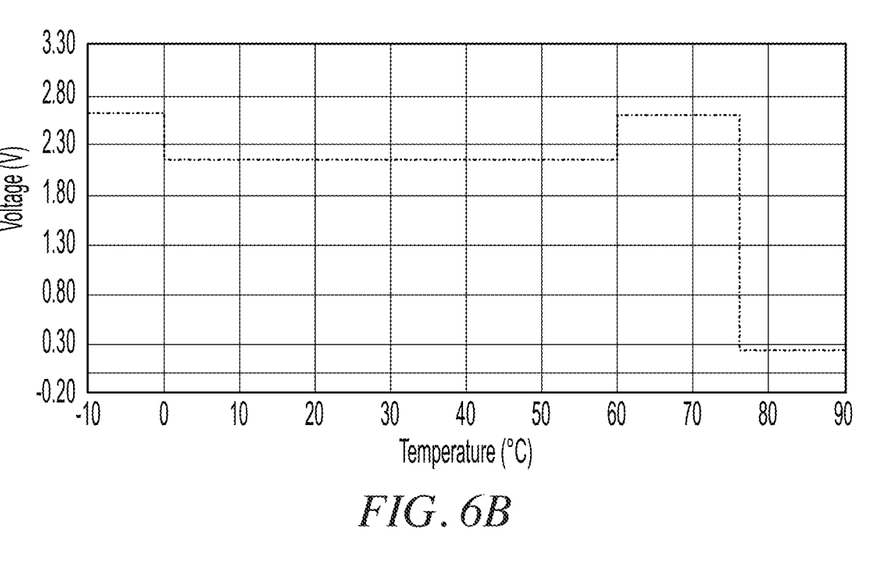

FIGS. 6A-B provide examples of the plurality of signals indicating the plurality of temperatures of the battery pack 100 received by the controller 400 of the device 300. FIG. 6A, for example, illustrates a thermistor that outputs a voltage linearly related to the temperature of the battery pack 100. For example, at 0° C., the thermistor outputs a voltage of approximately 2.30 V. As the battery pack 100 heats, the voltage output by the thermistor decreases. For example, when the battery pack has heated to 40° C., the voltage output by the thermistor decreases to approximately 0.9 V.

FIG. 6B illustrates a thermistor that outputs an alternative plurality of signals indicating the plurality of temperatures of the battery pack 100 received by the controller 400 of the device 300. In FIG. 6B, the thermistor outputs a constant voltage, such as 2.1 V, when the temperature is between 0° C. and 60° C. From −10° C. to 0° C., and from 60° C. to 75° C., the thermistor outputs a higher voltage, such as 2.6 V. Once the temperature of the battery pack 100 passes a high temperature threshold, such as 75° C., there is a significant drop in output voltage. For example, the voltage output by the thermistor drops to 0.3 V. Although two examples are shown, the plurality of signals indicating the plurality of temperatures of the battery pack 100 received by the controller 400 is not limited by these examples.

Referring back to block 506 of the method 500, the device 300 determines, based on the plurality of signals, the battery pack type. For example, the controller 400 may determine a slope of the plurality of signals indicating a plurality of temperatures of the battery pack. For example, the controller 400 receives a first temperature signal from the thermistor (for example, receiving a voltage of 2.1 V). The controller 400 continues to receive temperature signals in which the voltage drops (for example, 2.0 V, 1.8 V, and 1.7 V). Upon reaching a time threshold, the controller 400 determines a slope of −0.1 V/min, indicating the battery pack 100 is heating. This slope may be found by averaging the changes in voltage, by averaging multiple slopes over a given time period, or similar techniques. The slope may also indicate a change in temperature from one signal to the next. In another embodiment, the controller 400 continuously determines the slope. For example, the controller 400 receives a first temperature signal from the thermistor (for example, receiving a voltage of 2.1 V). The controller 400 next receives a second temperature signal from the thermistor (for example, receiving a voltage of 2.05 V). The controller 400 determines a slope of −0.05 by subtracting the second temperature signal from the first temperature signal. Next, the controller receives a third temperature signal from the thermistor, receiving a voltage of 1.95 V. The controller 400 determines a slope of −0.01 by subtracting the third temperature signal from the second temperature signal.

In one embodiment, a battery pack type is determined by comparing a slope of the plurality of signals to a predetermined slope. For example, upon determining a slope of the plurality of signals, the controller 400 compares the slope of the plurality of signals to a threshold slope stored within the memory 460. If the slope of the plurality of signals is above the threshold slope, the controller 400 determines the battery pack type to be a first battery pack type. If the slope of the plurality of signals is below the threshold slope, the controller 400 determines the battery pack type to be a second battery pack type. In another embodiment, if the slope of the plurality of signals is non-zero, such as the example provided above with respect to FIG. 6A, the controller 400 determines the battery pack type to be a first battery pack type. In yet another embodiment, if the slope of the plurality of signals is zero, such as the example provided above with respect to FIG. 6B, the controller 400 determines the battery pack type to be a second battery pack type.

In one embodiment, the controller 400 compares the slope of the plurality of signals to a plurality of slopes stored within the memory 460. For example, the memory 460 has a table of slopes. The slope of the plurality of signals is compared to each of the slopes of the table of slopes. The comparison of the slope of the plurality of signals with a slope of the table of slopes with the lowest error is chosen. The battery pack type associated with the slope of the table of slopes with the lowest error is determined.

Returning to FIG. 5, in block 508, the device 300 controls, based on the battery pack type, a discharge cycle of the battery pack. For example, the battery pack type has an associated discharge cycle. FIGS. 7A-7E provide examples of discharge cycles for the battery pack 100. In one embodiment, a first battery pack type is determined. The discharge cycle illustrated in FIG. 7A may be associated with the first battery pack type. The battery pack 100 may output power at power value a1 until a battery capacity value x1 is reached. When battery capacity x1 is reached, the output power is linearly reduced from power value a1 to power value a2 until battery capacity value x2 is reached. Next, the output power is maintained at power value a2 until battery capacity value x3 is reached. Output power is then linearly reduced from power value a2 to power value a3 until battery capacity value x4 is reached.

Figure 7A:
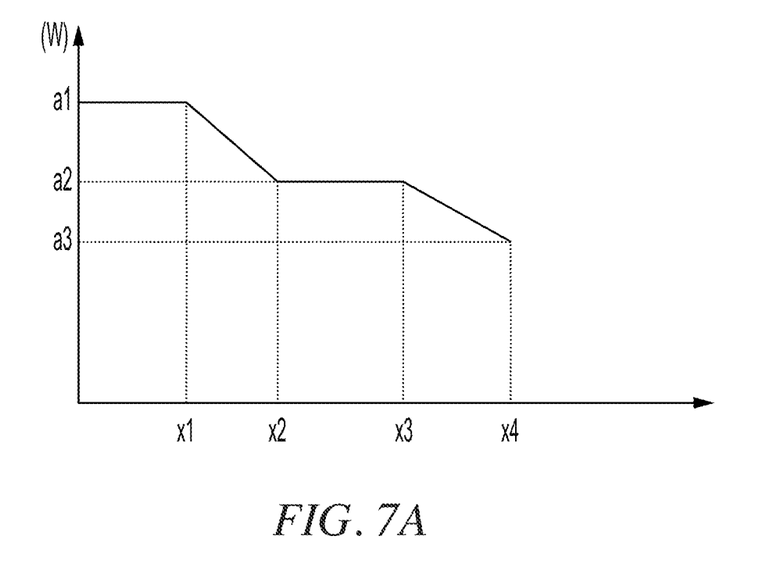
FIGS. 7A, 7B, 7C, 7D, and 7E illustrate discharge cycles of the battery pack of FIG. 1, according to some embodiments.

Although the battery capacity values are moving in the positive direction on the axis, the battery capacity values are decreasing. The battery capacity values above may be voltage values, indicating the discharge is based on the battery cell voltage. For example, x1 may be 12 V, and x2 may be 10 V. The battery capacity values may also be times, indicating a time-based discharge. For example, x1 may be 10 seconds, and x2 may be 50 seconds. For, example, the output power is gradually reduced from power value a1 to power value a2 over the 40 second time period. The battery capacity values may also be a combination of time values and voltage values. For example, x1 may be 10 seconds, x2 may be 50 seconds, and x3 may be 8 V. Additionally, although the output power is shown to decrease linearly, it is not restricted to a linear decrease. For example, the output power may decrease non-linearly, exponentially, or similar manners.

Figure 7B:
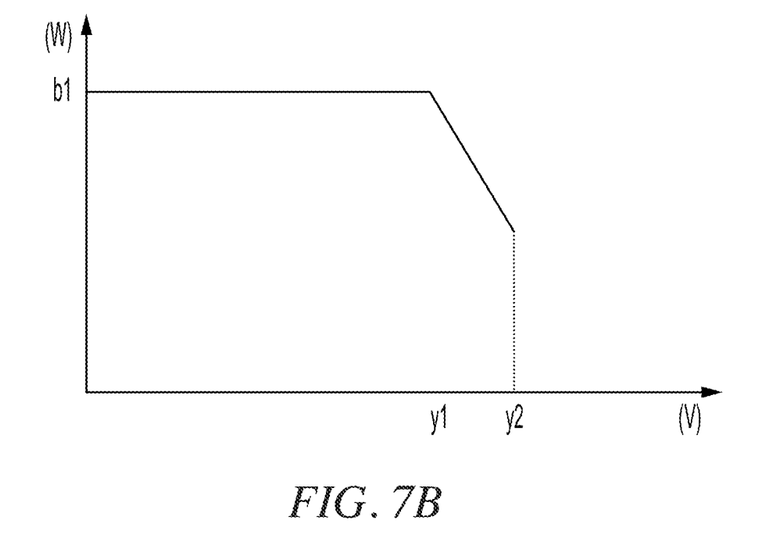

FIG. 7B provides another embodiment of a discharge cycle of the battery pack. In this example, power is output at a power value b1 until battery capacity reaches a battery capacity value y1. Upon reaching battery capacity y1, the power output decreases linearly until a battery capacity value y2 is reached.

Figure 7C:
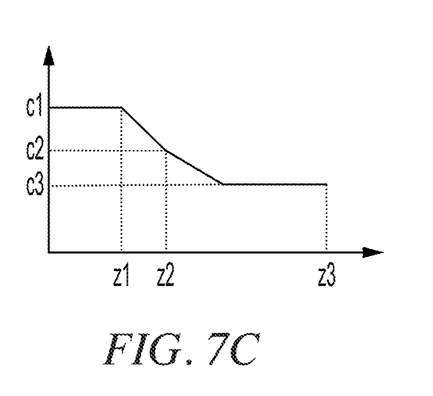

FIG. 7C provides another embodiment of a discharge cycle of the battery pack. In this example, power is output at a power value c1 until battery capacity value z1 is reached. Upon reaching battery capacity value z1, the output power decreases from power value c1 to power value c2 until battery capacity value z2 is reached. Upon reaching battery capacity value z2, the output power continues to decrease, but at a slope substantially less than the slope between battery capacity value z1 and the battery capacity value z2. The output power decreases until reaching power value c3. The output power is maintained at power value c3 until reaching battery capacity value z3.

Figure 7D:
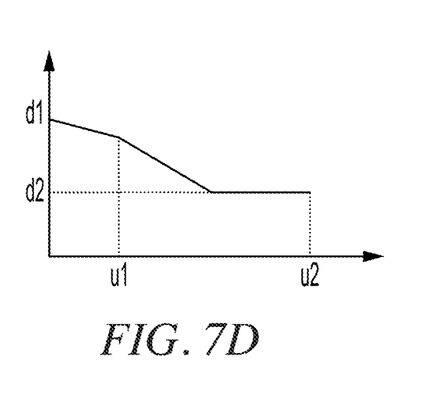

FIG. 7D provides another embodiment of a discharge cycle of the battery pack. In this example, discharge begins at power value d1, but immediately begins to decrease the output power. The output power decreases in value until battery capacity value u1 is reached. Upon reaching battery capacity value u1, the output power continues to decrease in value at a slope substantially greater the slope between the beginning of discharge and battery capacity value u1. The output power continues to decrease until power value d2 is reached. The output power is maintained at output value d2 until battery capacity value u2 is reached.

Figure 7E:
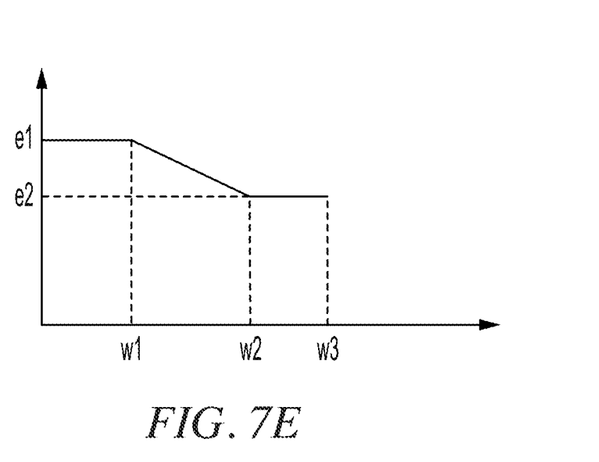

FIG. 7E provides another embodiment of a discharge cycle of the battery pack. In this example, discharge begins at power value e1. Discharge continues at power value e1 until battery capacity value w1 is reached. Upon reaching battery capacity value w1, the output power decreases to power value d1 at battery capacity value w2. The output power is maintained at power value e2 until battery capacity value w3 is reached.

Embodiments of the invention are not restricted to the examples given above. The discharge cycle of the battery pack may also include a step function of decreasing power, a series of decreasing ramp function, exponential discharges, constant discharges, and the like.

Thus, embodiments described herein provide a device configured to determine a battery pack type based on a plurality of signals indicating a plurality of temperatures of the battery pack. Various features and advantages are set forth in the following claims.

What is claimed is:

1. A power tool comprising:
a controller including an electronic processor and a memory, the controller configured to:
receive a plurality of signals indicating a plurality of temperatures of a battery pack,
determine, based on the plurality of signals, a battery pack type, and
control discharge of the battery pack based on the battery pack type.

2. The power tool of claim 1, wherein the discharge of the battery pack includes a constant power.

3. The power tool of claim 1, wherein the discharge of the battery pack includes a step function of decreasing power.

4. The power tool of claim 1, wherein the discharge of the battery pack includes a series of decreasing ramp functions.

5. The power tool of claim 1, wherein the battery pack is configured to be discharged at a first power for a first period of time, the discharge is configured to be decreased from the first power to a second power over a second period of time, and the battery pack is configured to discharge at a third power over a third period of time.

6. The power tool of claim 1, wherein the plurality of signals indicating the plurality of temperatures of the battery pack are based on a thermistor of the battery pack.

7. The power tool of claim 1, wherein the plurality of signals indicating the plurality of temperatures of the battery pack are equal in value.

8. The power tool of claim 1, wherein the controller is further configured to:
receive a first signal of the plurality of signals indicating a first temperature of the battery pack;
receive a second signal of the plurality of signals indicating a second temperature of the battery pack; and
determine a slope of the plurality of signals by subtracting the second temperature from the first temperature to determine the battery pack type.

9. The power tool of claim 8, wherein the controller is further configured to:
compare the slope of the plurality of signals to a predetermined slope to determine the battery pack type.

10. A battery pack comprising:
at least one battery cell;
a discharge circuit configured to discharge current from the battery cells to an electronic device; and
a thermistor configured to provide a plurality of signals indicating a plurality of temperatures of the battery pack to the electronic device,
wherein the plurality of signals is provided to the electronic device to determine a type of the battery pack for controlling the discharge current of the battery pack based on the type of the battery pack.

11. The battery pack of claim 10, wherein the discharge current of the battery pack includes a constant power.

12. The battery pack of claim 10, wherein the discharge current of the battery pack includes a ramp function of decreasing power.

13. The battery pack of claim 10, wherein the discharge current of the battery pack includes a step function of decreasing power.

14. The battery pack of claim 10, wherein the battery pack is configured to discharge at a first power for a first period of time, the discharge is configured to be decreased from the first power to a second power over a second period of time, and the battery pack is configured to discharge at a third power over a third period of time.

15. The battery pack of claim 10, wherein the plurality of signals indicating the plurality of temperatures of the battery pack are equal in value.

16. A method of determining a battery pack type, the method comprising:
receiving a plurality of signals indicating a plurality of temperatures of a battery pack;
determining, based on the plurality of signals, the battery pack type; and
controlling, based on the battery pack type, a discharge cycle of the battery pack.

17. The method of claim 16, wherein the plurality of signals indicating the plurality of temperatures of the battery pack is provided by a thermistor of the battery pack.

18. The method of claim 16, wherein the plurality of signals indicating the plurality temperatures of the battery pack are equal in value.

19. The method of claim 16, further comprising comparing a slope of the plurality of signals to a predetermined slope.

20. The method of claim 16, further comprising discharging at a first power for a first period of time, decreasing discharging from the first power to a second power over a second period of time, and discharging at a third power over a third period of time.

* * * * *